United States Patent
Everson et al.

(10) Patent No.: US 8,423,033 B1
(45) Date of Patent: Apr. 16, 2013

(54) METHOD AND SYSTEM FOR ALLOCATING BANDWIDTH IN A WIRELESS COMMUNICATION SYSTEM HAVING A TREE STRUCTURE

(75) Inventors: John M. Everson, Kansas City, MO (US); Jeremy G. Titus, Spring Hill, KS (US); Jason R. Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2395 days.

(21) Appl. No.: 11/159,725

(22) Filed: Jun. 23, 2005

(51) Int. Cl.
*H04W 40/00* (2009.01)
*H04W 72/00* (2009.01)
*H04W 4/00* (2009.01)
*H04B 7/212* (2006.01)
*H04J 3/16* (2006.01)
*H04J 3/22* (2006.01)
*H04J 3/18* (2006.01)

(52) U.S. Cl.
USPC ........... 455/450; 370/322; 370/329; 370/468; 370/477; 455/445; 455/446; 455/452.1

(58) Field of Classification Search ........... 370/322, 370/327, 329, 341, 346, 348, 436, 437, 468, 370/477; 455/445, 446, 449, 450
See application file for complete search history.

(56) References Cited

U.S. PATENT DOCUMENTS

| | | | |
|---|---|---|---|
| 5,930,240 A * | 7/1999 | Wichman | 370/315 |
| 6,763,236 B2 * | 7/2004 | Siren | 455/450 |
| 6,978,144 B1 * | 12/2005 | Choksi | 455/452.2 |
| 7,593,718 B2 * | 9/2009 | Gorday et al. | 455/412.1 |
| 7,957,359 B1 * | 6/2011 | Robson et al. | 370/341 |
| 2002/0141382 A1 * | 10/2002 | Winther et al. | 370/352 |
| 2004/0230444 A1 * | 11/2004 | Holt et al. | 705/1 |
| 2005/0071471 A1 * | 3/2005 | Saenz | 709/226 |
| 2005/0088968 A1 * | 4/2005 | Lauer | 370/229 |

OTHER PUBLICATIONS

F. Cali et al., "IEEE 802.11 Wireless LAN: Capacity Analysis and Protocol Enhancement", IEEE, 1998.
"EN-3001 Intelligent Wideband WLAN Technology", http://www.engim.com/products_technology.html, printed on Jan. 11, 2005.
"Creating a Wireless Network", http://www.wi-fi.org/OpenSection/design.asp?TID2#Count, printed in Mar. 2005.
"OIT Wireless Service", http://www.net.princeton.edu/wireless-networking.html, Mar. 2005.

(Continued)

*Primary Examiner* — Kent Chang
*Assistant Examiner* — Nathan Brittingham

(57) ABSTRACT

A method and system for allocating bandwidth in a wireless communication system arranged as a tree structure having a plurality of nodes that are each either a subscriber node or a base station node. A given one of the base station nodes within the tree structure directly serves a plurality of child nodes including at least one child base station node that itself directly serves at least one child subscriber node. The method of bandwidth allocation includes (i) determining a total number of descendant subscriber nodes of the given base station node and (ii) using the total number descendant subscriber nodes of the given base station node as a basis to proportionally allocate a quantity of data bandwidth at the given base station node among the total number of descendant subscriber nodes of the given base station node.

18 Claims, 5 Drawing Sheets

OTHER PUBLICATIONS

M.L. Lahti, "IEEE 802.11 Wireless LAN", Department of Electrical Engineering, Helsinki University of Technology, May 19, 2000.

"WLAN Quick Start: Getting up to Speed on 802.11 Wireless LANs", http://www.devx.com/wireless/Article/11424, printed in Jan. 2005.

"KarlNet Outdoor Wireless Base Station (WBS), Wireless Repeater Unit (WRU), Wireless Client (WCL): Setup and Installation Manual", KarlNet Inc., 2004.

". . . WDS (Wireless Distribution System", ORiNOCO Technical Bulletin 046/A by Agere Systems Inc., Feb. 2002.

"Vivato Based VoIP: Application: Wi-Fi Base Station", Vivato Inc., 2004.

"WLG-500DX: 802.11g Wireless Dual-Radio Bridge-Repeater", Product Specifications from Toplink C&C Corp., version 1.0, Aug. 2, 2004.

* cited by examiner

METHOD AND SYSTEM FOR ALLOCATING BANDWIDTH IN A WIRELESS COMMUNICATION SYSTEM HAVING A TREE STRUCTURE

BACKGROUND

1. Field of the Invention

The present invention relates to telecommunications and, more particularly, to a method and system for allocating data bandwidth in a wireless communication system.

2. Description of Related Art

A wireless communication system, such as a wireless local area network (WLAN), typically includes a number of base station nodes that provide wireless data communication service to subscribers. Often, these systems may be arranged such that individual base station nodes can directly serve a number of subscriber nodes and can also directly communicate with one or more other base station nodes to transport subscriber data between different network locations.

For example, a wireless communication system may include a given base station node providing connectivity to a wired data network, such as the Internet. As such, subscriber nodes operating within the coverage area served directly by the given base station node may wirelessly connect to the wired data network via the given base station node. Further, to extend wired-network connectivity to other subscriber nodes that may be operating out of the serving range of the given base station, the wireless communication system may include a number of additional base station nodes to provide wireless coverage to area(s) not covered by the given base station node. The system may then be arranged such that subscriber data traffic associated with a respective one of the additional base station nodes may be wirelessly communicated between the additional base station node and the given base station node. The wireless communication between the additional base station node and the given base station node may occur over a direct wireless link or through other intermediate base station node(s).

At any point in such wireless system, thus, there might be a particular base station node that directly serves multiple nodes, at least one of which is another base station node. The other base station node can, in turn, directly serve one or more subscriber nodes and possibly a number of base station nodes. As such, the particular base station node may be required to share its bandwidth resources among any subscriber nodes that it is directly serving and subscriber data traffic communicated with the other base station node. A need, therefore, exists to intelligently allocate bandwidth at any such particular base station node.

SUMMARY

The present invention provides a mechanism for allocating bandwidth in a wireless communication system. More particularly, according to the present invention, a wireless communication system is viewed as a tree structure having a plurality of nodes that are each either a subscriber node or a base station node. Each base station node is arranged to serve one or more child nodes directly over a respective air interface. Further, a given one of the base station nodes within the tree structure directly serves a plurality of child nodes including at least one child base station node that itself directly serves at least one child subscriber node.

In accordance with one disclosed embodiment, the invention involves (i) determining a total number of descendant subscriber nodes of the given base station node and (ii) using the total number of descendant subscriber nodes of the given base station node as a basis to proportionally allocate a quantity of data bandwidth at the given base station node for distribution of the data bandwidth among the total number of descendant subscriber nodes of the given base station node.

In the disclosed embodiment, the total number of descendant subscriber nodes of the given base station node is determined as a sum of a count of child subscriber nodes (if any) served directly by the given base station node and a count of descendant subscriber nodes of the at least one child base station node of the given base station node. Once the total number of descendant subscriber nodes has been determined, it then serves as a basis to proportionally allocate a quantity of data bandwidth at the given base station node.

In one particular example of this process, the quantity of data bandwidth is divided by the total number of descendant subscriber nodes to establish a per-subscriber bandwidth ration. If the given base station node is currently serving any child subscriber nodes, then each child subscriber node of the given base station node is allocated the per-subscriber bandwidth ration. In turn, each child base station node of the given base station node is allocated a portion of data bandwidth that is equivalent to a mathematical product of the per-subscriber bandwidth ration and a count of descendant subscriber nodes of the child base station node.

In addition, a service level of a descendant subscriber node of the given base station node may provide a further basis to proportionally allocate the quantity of data bandwidth at the given base station node. In one example, given two subscriber nodes that each have a respective service level, a descendant subscriber node with a higher service level may, in fact, be allocated more data bandwidth than a descendant subscriber node with a lower service level. In another example, a service level of a given descendant subscriber node may indicate a minimum amount of data bandwidth for allocation to the given descendant subscriber node. Accordingly, the given descendant subscriber node is allocated at least the minimum amount of data bandwidth to maintain the service level of that node.

These as well as other aspects and advantages will become apparent to those of ordinary skill in the art by reading the following detailed description, with reference where appropriate to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Overview

Figure 1:
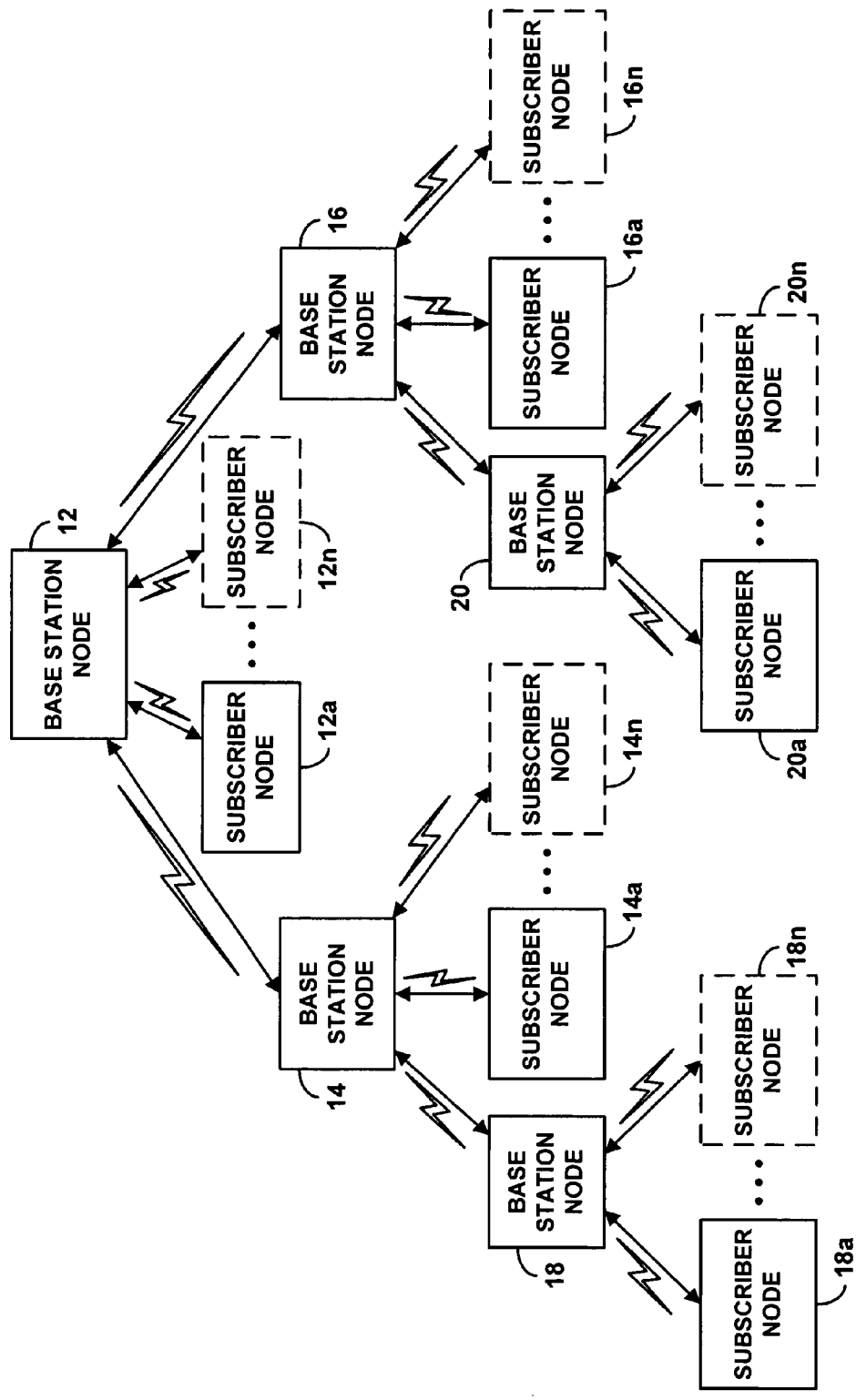
FIG. 1 is a block diagram of a system that can operate in accordance with an exemplary embodiment.

Referring now to the drawings, FIG. 1 is a simplified block diagram of a wireless communication system 10 that can operate in accordance with an exemplary embodiment of the present invention. As shown in FIG. 1, wireless communication system 10 is arranged as a tree structure having a plurality of nodes that are each either a base station node or a subscriber node. In a typical tree structure, as illustrated in FIG. 1, nodes are hierarchically organized as "branches" that descend from a "root" node at the highest (or top) level to so-called "leaf" nodes at the lowest level.

Normally, higher-level nodes are referred to as "parent" nodes of the nodes directly below them. In turn, the lower-level nodes directly below the parent nodes are refereed to as "child" nodes. As depicted in FIG. 1, the top-level "root" node of a typical tree structure does not have a parent node, while all the other nodes within the tree have a single parent node. In particular, in regards to FIG. 1, each base station node is arranged as a parent node that serves one or more child nodes directly over a respective air interface. Further, any subscriber node that is below (or "descends" from) a given base station node in a tree structure may be referred to as a descendant subscriber node of the given base station node. A child node is sometimes called an immediate descendant node of a parent node.

For example, in the wireless arrangement of FIG. 1, a top-level (root) base station node 12 may directly serve one or more child base station nodes, such as child base station nodes 14 and 16, and may further directly serve one or more child subscriber nodes 12a-n. In turn, base station node 14 may directly serve one or more child subscriber nodes 14a-n, and may further directly serve a child base station node 18 that itself directly serves one or more child subscriber nodes 18a-n. Similarly, base station node 16 may directly serve one or more child subscriber nodes 16a-n, and may further directly serve a child base station 20 that itself directly serves one or more child subscriber nodes 20a-n.

Thus, within the tree structure of FIG. 1, subscriber nodes 14a-n and 18a-n may be considered descendant subscriber nodes of base station node 14, while subscriber nodes 16a-n and 20a-n may be considered descendant subscriber nodes of base station node 16. In a similar way, subscriber nodes 12a-n, 14a-n, 16a-n, 18a-n and 20a-n may be all considered descendant subscriber nodes of base station node 12.

Note, however, that the tree structure of wireless communication system 10 may take various forms, and fewer or more base station nodes and/or subscriber nodes may be included. By way of example, each of the base station nodes in system 10 may serve additional base station and/or subscriber nodes not shown.

Figure 2:
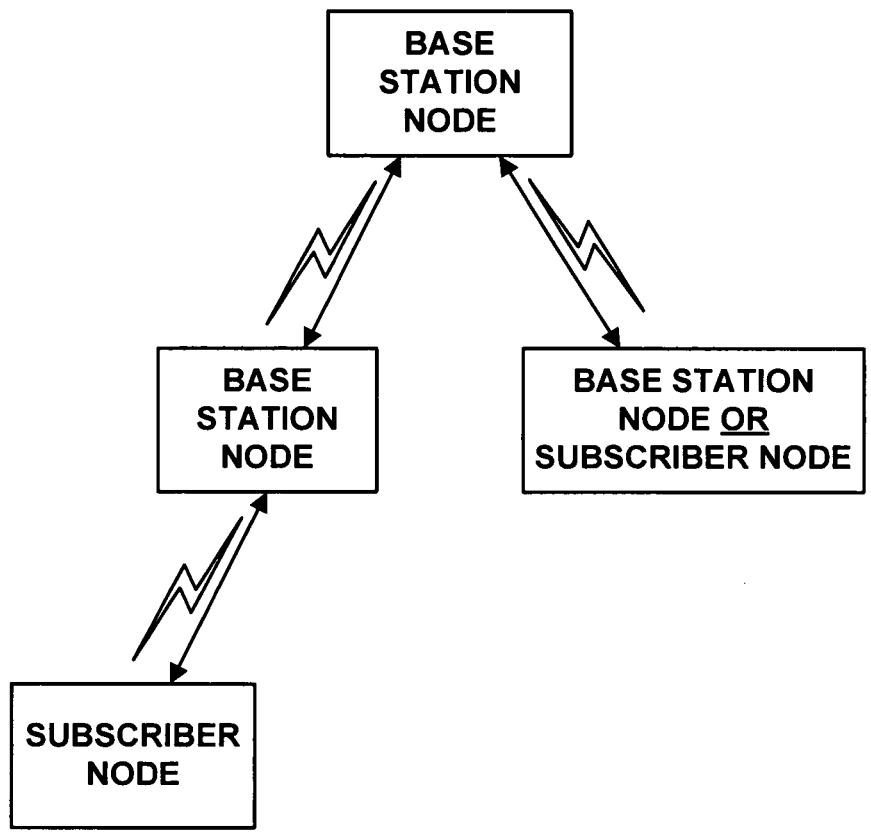
FIG. 2 is a flow chart depicting functions that may be carried out according to the exemplary embodiment.

As shown in FIG. 1, the tree structure of wireless communication system 10 may include a number of base station nodes, such as base station nodes 12, 14, and 16, that each directly serve a plurality of child nodes including at least one child base station node that itself directly serves at least one child subscriber node. FIG. 2 illustrates a block diagram of this particular node arrangement that may form or be a part of a given tree structure.

For example, with reference to FIG. 1, wireless communication system 10 is arranged such that base station node 18 communicates data to/from subscriber nodes 18a-n with base station node 14. In turn, base station node 14 communicates data to/from subscriber nodes 18a-n as well as to/from its own directly served subscriber nodes 14a-n with base station node 12. In a similar way, base station node 20 communicates data to/from subscriber nodes 20a-n with base station node 16, which, in turn, communicates data to/from subscriber nodes 20a-n as well as to/from its own directly served subscriber nodes 16a-n with base station node 12.

Thus, at a given moment, any one of base station nodes 12, 14, and 16 within system 10 may serve (i) all of its direct child subscriber nodes (if any) and (ii) all of descendant subscriber nodes of each of its at least one direct child base station node. However, any such base station node may only have a limited quantity of data bandwidth available for subscriber data traffic (i.e., data communicated to/from subscribers), and the limited quantity of data bandwidth may need to be shared among all of descendant subscriber nodes of the base station node.

Note, as defined herein, the term "data bandwidth" refers to an amount of data that can be carried along a communication path (e.g., a communication channel) in a given time period, and is usually expressed in bits (of data) per second (bps). Typically, the higher the data bandwidth of a communication channel, the greater the volume of data that can be sent through the communication channel. For example, a communication channel with a high enough data bandwidth may be able to carry enough data to sustain the succession of images in bandwidth-demanding video applications, such as video conferencing. Often, the term "data bandwidth" is used as a synonym for "data transfer (or transmission) rate", or simply "data rate", for short.

For example, a given base station node (within a tree structure), which directly serves a plurality of child nodes including at least one child base station node that itself directly serves one or more child subscriber nodes, may use (i.e., may be configured to use or may have available for use) a particular radio frequency (RF) channel for carrying subscriber data traffic. Typically, the RF channel will have a certain maximum data bandwidth (or maximum data capacity), such that it will be only able to carry a quantity of subscriber data that does not exceed this maximum bandwidth. Thus, if the given base station node concurrently communicates with all of its descendant subscriber nodes, the maximum data rate capacity of the channel may need to be shared among all of the descendant subscriber nodes of the given base station node.

Figure 3:
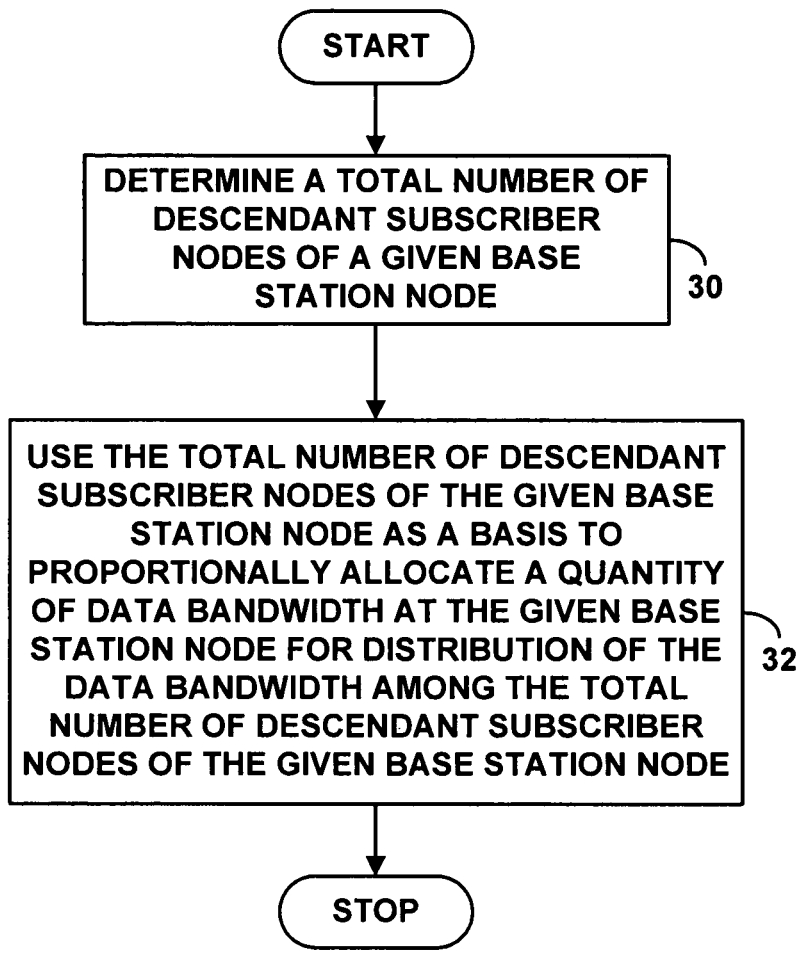
FIG. 3 is a block diagram of one particular node arrangement.

FIG. 3 is a flow chart summarizing a set of functions that could be carried out to allocate data bandwidth for distribution to descendant subscriber nodes of a given base station node within a tree structure, where the given base station node directly serves a plurality of child nodes including at least one child base station node that itself directly serves at least one child subscriber node, in accordance with the exemplary embodiment.

As depicted in FIG. 3, step 30 involves determining a total number of descendant subscriber nodes of the given base station node. Step 32 then involves using the total number of descendant subscriber nodes of the given base station node as a basis to proportionally allocate a quantity of data bandwidth at the given base station node for distribution of the data bandwidth among the total number of descendant subscriber nodes of the given base station node.

For instance, referring back to FIG. 1, the process of bandwidth allocation illustrated in FIG. 3 may be carried out at the top-level (root) base station node 12. In particular, base station node 12 may be arranged (e.g. programmed with program logic executed by a processor) to determine a total number of descendant subscriber nodes ($N_{TOTAL}$) of the base station node. For example, base station node 12 may be programmed to calculate the total number of descendant subscriber nodes as a sum of (i) a count of child subscriber nodes (if any) directly served by base station node 12 and (ii) a count of descendant subscriber nodes of the one or more child base station nodes of base station node 12 (i.e., base station nodes being served directly by base station node 12).

By way of example, in the arrangement of FIG. 1, the total number of descendant subscriber nodes of base station node 12 may be calculated as a sum of (i) a count of child subscriber nodes 12a-n and (ii) a count of descendant subscriber nodes of base station nodes 14 and 16, where the count of descendant subscriber nodes of base station nodes 14 and 16 may be calculated as a sum of (iii) a count of subscriber nodes 14a-n and 18a-n (descendant subscriber nodes of base station node 14) and (iv) a count of subscriber nodes 16a-n and 20a-n (descendant subscriber nodes of base station node 16). The calculated total number of descendant subscriber nodes of base station node 12 (i.e., $N_{TOTAL}$) may be then used to proportionally allocate a quantity of data bandwidth at base station node 12 for distribution of the data bandwidth among all of the descendant subscriber nodes of base station node 12, i.e., among subscriber nodes 12a-n, 14a-n, 16a-n, 18a-n and 20a-n.

According to one exemplary embodiment, the function of using the total number as a basis to proportionally allocate the quantity of data bandwidth at the given base station node may include (i) dividing the quantity of data bandwidth ($B_{TOTAL}$) by the total number of descendant subscriber nodes to establish a per-subscriber bandwidth ration ($B_{RATION}$), i.e., $$B_{RATION} = B_{TOTAL}/N_{TOTAL}$$

and further, (ii) allocating to each child subscriber node, if any, of the given base station node the per-subscriber bandwidth ration, and (iii) allocating to each child base station node of the given base station node a mathematical product of the per-subscriber bandwidth ration and a count of descendant subscriber nodes of the child base station node.

As an example, if the quantity of data bandwidth available at base station node 12 is 10 Mbps and the total number of descendant subscriber nodes of base station node 12 is ten (10) subscriber nodes, then the available bandwidth of 10 Mbps may be proportionally allocated among the 10 descendant subscriber nodes of base station node 12.

In this example above, base station node 12 may be arranged to divide 10 Mbps of data bandwidth by 10 (which represents the total number of descendant subscriber nodes of base station node 12) to determine a per-subscriber bandwidth ration of 1 Mbps. Assuming that the count of child subscriber nodes of base station node 12 (i.e., subscriber nodes 12a-n) is two (2), base station node 12 may allocate 1 Mbps per-subscriber bandwidth ration to each of the two child subscriber nodes of base station node 12. Further, assuming that the count of descendant subscriber nodes of child base station node 14 (i.e., subscriber nodes 14a-n and 18a-n) is five (5), then base station node 12 may allocate 5 Mbps, i.e., the mathematical product of 5 descendant subscriber nodes of base station node 14 and the per-subscriber bandwidth ration of 1 Mbps, to base station node 14. Similarly, assuming that the count of descendant subscriber nodes of child base station node 16 (i.e., subscriber nodes 16a-n and 20a-n) is three (3), then base station node 12 may allocate 3 Mbps, i.e., the mathematical product of 3 descendant subscriber nodes of base station node 16 and the per-subscriber bandwidth ration of 1 Mbps, to base station node 16.

Note that the exemplary bandwidth-allocation process described above with respect to base station node 12 is not limited to being carried out only at the top-level (or root) base station node within a given tree structure, and may be carried out at any other base station node that directly serves a plurality of child nodes including at least one child base station node that itself directly serves one or more child subscriber nodes. For example, in FIG. 1, the process of bandwidth allocation illustrated in FIG. 3 may be alternatively, or in addition to, carried out at each of base station nodes 14 and 16.

2. Network Architecture and Operation

Figure 4:
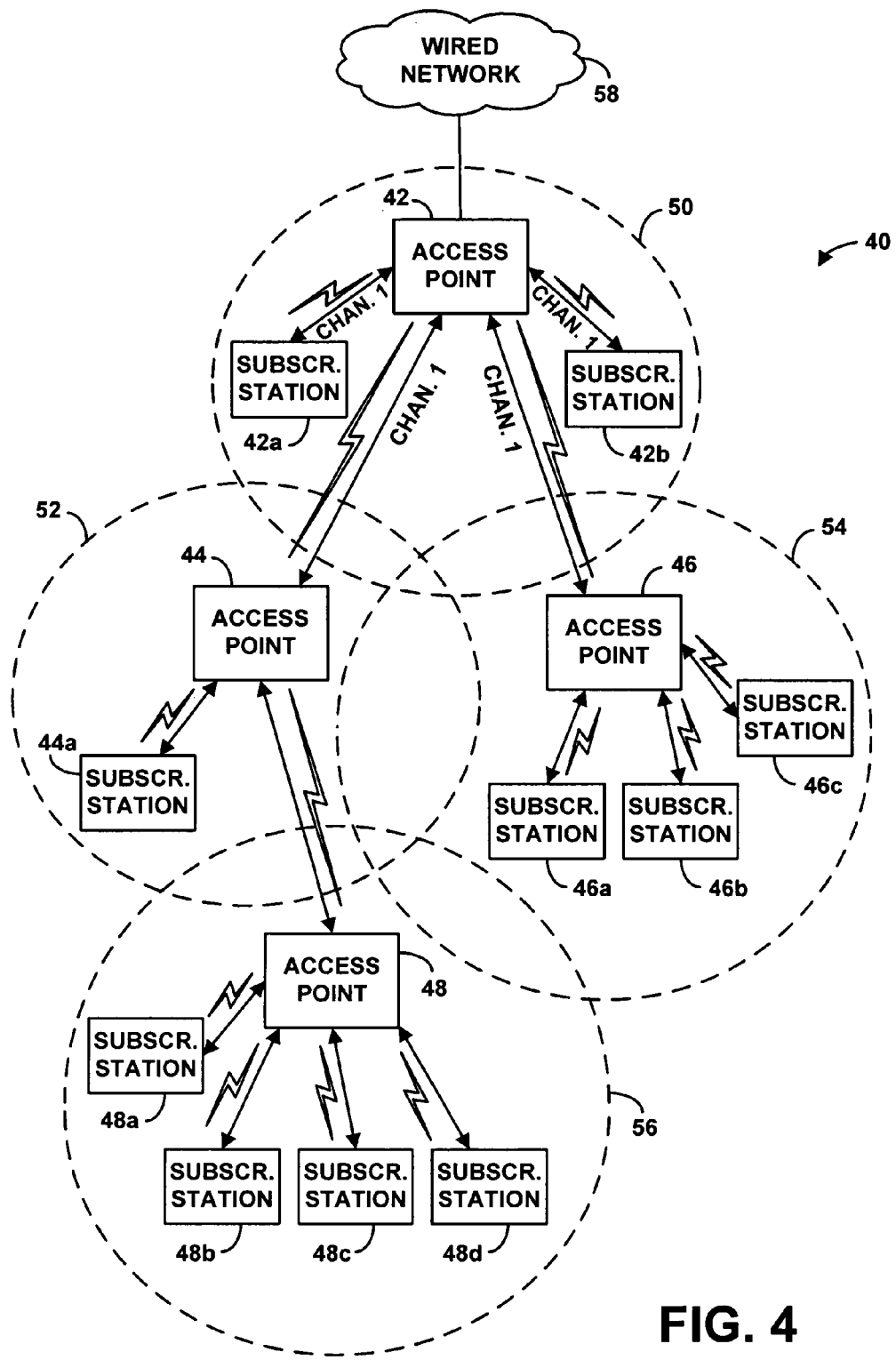
FIG. 4 is a block diagram depicting in more detail a wireless network arrangement that can operate in accordance with the exemplary embodiment.

While system 10 is generically representative of an arrangement in which an exemplary embodiment can be implemented, various details are possible. Referring next to FIG. 4, a more specific wireless local area network arrangement 40 (WLAN 40) is illustrated.

Wireless local area networks commonly operate according to the well known IEEE (Institute of Electrical and Electronics Engineers) 802.11 standards that define the physical layer and Media Access Control (MAC) layer for wireless local area networking. A typical 802.11 WLAN may include a number of "cells" known as the basic service sets (BSSs). In general, a BSS contains one or more subscriber stations that wirelessly communicate with an 802.11 base station, typically referred to as an access point (AP) in the 802.11 terminology. Whenever a subscriber station, which may be fixed or mobile, is within the coverage area of the BSS controlled by the 802.11 base station, the subscriber station may communicate with the base station over an air interface using any suitable 802.11x protocol(s) from the current IEEE 802.11 protocol family, including (among others) IEEE 802.11a, IEEE 802.11b, and IEEE 802.11g. In turn, the base station will typically serve to provide the subscriber station with a wireless access to a wired data network (e.g., the Internet, intranet, and/or some other type of a wired network).

Further, multiple BSSs may be interconnected together by means of so-called distribution system (DS) to form an extended service set (ESS) that serves to extend network coverage of a WLAN. In the ESS-based WLAN, the access points may communicate among themselves through the distribution system to forward subscriber data traffic from one BSS to another. The distribution system serves as the backbone of a WLAN, and may be constructed of either wired (e.g., wired Ethernet) or wireless (RF) links between respective access points within the WLAN. In the case where the access points wirelessly communicate among themselves, the distribution system is commonly referred to as a wireless DS, or WDS.

WLAN access points that are interconnected with each other through WDS links may typically function to exchange data frames (or packets) for wireless subscriber stations in their respective BSSs, to forward subscriber data frames as a mobile subscriber moves from one BSS coverage area to another (so that the subscriber remains connected to the WLAN as the subscriber roams through the network), and/or to exchange data frames with a wired network. In the latter instance, a given WLAN may be arranged such that a designated access point/802.11 base station (e.g., sometimes referred to as a central/root access point/802.11 base station) within the WLAN has a connectivity to a wired network, while the remaining access points communicate with the central access point over the WDS to connect wireless subscriber stations within their respective coverage areas to the wired network.

More particularly, data traffic associated with a wireless subscriber station connected to the wired network but not directly served by the central access point may be forwarded between a given access point directly serving the subscriber and the central access point. The exchange of subscriber data between the given access point and the central access point may occur over a direct wireless link if the given access point is served directly by the central access point. Otherwise, subscriber data may be relayed between the given access point and the central access point through other intermediate access point(s).

FIG. 4 illustrates one such example network arrangement in which WLAN 40 is arranged as a tree structure comprising a plurality of WLAN nodes that are each either a base station node or a subscriber node. In WLAN 40, each base station node (i.e., an access-point node) is arranged to serve one or more child nodes (i.e., subscriber-station nodes) directly over a respective air interface. (Note that in FIG. 4, the term "subscriber station" is abbreviated as "subscr. station".) Further, WLAN 40 includes at least one given base station node that directly serves a plurality of child nodes including at least one child base station node that itself directly serves at least one child subscriber node.

It should be understood, however, that this and other arrangements and processes described herein are set forth for purposes of example only, and other arrangements and elements (e.g., machines, interfaces, functions, orders of elements, etc.) can be added or used instead and some elements may be omitted altogether. For example, WLAN 40 may include fewer or more access point nodes and/or subscriber nodes than shown in FIG. 4.

Further, those skilled in the art will appreciate that many of the elements described herein are functional entities that may be implemented as discrete components or in conjunction with other components, in any suitable combination and location, and various functions could be carried out by software, firmware and/or hardware.

In addition, in an illustrative embodiment, the nodes within WLAN 40 are assumed to operate according to the IEEE 802.11 standards, including any of the current or future standards of the 802.11 family. Alternatively or additionally, WLAN 40 may use variations of IEEE 802.11, IEEE 802.16 (WiMax), Bluetooth, HomeRF, HiperLAN, a Multichannel Multipoint Distribution Service (MMDS), Ultra Wide Band (UWB), or some other wireless protocol or format for wireless communication. Further, the principles discussed herein may apply to other types of wireless networks, such as a cellular network, using any suitable communication protocol(s) (e.g., Code Division Multiple Access (CDMA) or General Packet Radio Service (GPRS)).

As illustrated in FIG. 4, the tree structure of WLAN 40 includes a "root" access point 42 (base station node 42) that is connected to a wired network 58 and that directly serves an access point 44 (a child base station node of base station node 42) and an access point 46 (a child base station node of base station node 42). As shown in FIG. 4, access point 42 may additionally directly serve a number of subscribers, such as subscribers 42a and 42b (child subscriber nodes of base station node 42). Access point 44 then directly serves an access point 48 (a child base station node of base station node 44) and a subscriber 44a (a child subscriber node of base station node 44), while access point 46 directly serves subscribers 46a-c (child subscriber nodes of base station node 46). In turn, access point 48 directly serves subscribers 48a-d (child subscriber nodes of base station node 48).

As shown in FIG. 4, access points 42, 44, 46, and 48 may provide respective wireless coverage areas 50, 52, 54, and 56 that are shown idealized as overlapping circles that may provide substantially contiguous RF coverage within WLAN 40. In reality, however, these coverage areas may vary widely in shape and size. As one example, WLAN 40 may be an outdoor/indoor 802.11 network in which access point 42 may take the form of a more specialized 802.11 base station configured (e.g., using smart antenna technology) to provide customized coverage for a given area, while each of the other access points may be used to fill holes in RF coverage of access point 42. Various other examples may also be possible.

Each of the wireless subscriber stations shown in FIG. 4 may take various forms, and the stations might be the same or different types. Some examples of suitable subscriber stations include wireless computers (e.g., laptops) or handheld wireless mobile devices (e.g., mobile phones, personal data assistants (PDAs), smart phones, etc.), equipped with appropriate means to communicate over an 802.11x air interface. In this regard, each subscriber station may be equipped with an antenna for sending and receiving radio frequency (RF) signals over the interface, as well as an 802.11 PC (or PCMCIA) card or a built-in 802.11 chipset.

Wired network 58 may be a private network, such as an enterprise network (e.g., a private corporate local area network (LAN)), a public network (e.g., the Internet or another public network connected to the Internet), or a combination of private and/or public networks. For example, WLAN 40 may be deployed to provide wireless access to an enterprise network, such that enterprise subscribers can wirelessly connect to enterprise application servers and/or other enterprise network resources, and can also connect to the Internet through the enterprise network.

Further, connectivity with wired network 58 may enable access point 42 to communicate with back-end entities located on the wired network, such as authentication/authorization servers (e.g., a back-end RADIUS (Remote Authentication User Dial-In Service) server to facilitate authentication of subscribers), databases storing subscriber service-profile records, and/or other network entities. (Note that "authentication" service in a WLAN provides a mechanism of identifying subscribers to prevent unauthorized access to the WLAN).

To enable communication between access points within WLAN 40, a properly equipped access point (e.g., an "AP/Bridge-Repeater" device, as commonly termed in the industry) may be configured to provide WDS-based bridged interface for establishing wireless WDS links with other access points. For example, a typical bridge-enabled access point may maintain up to six wireless connections with other access points communicating over a WDS. To create a point-to-point WDS link between two access points, an access point at one end of the WDS link may be configured (e.g., locally or remotely using a suitable management software) with a MAC address of the access point at the other end of the link. (A MAC address is a unique hardware address associated with a WLAN station). The two access points will then normally be tuned to the same RF channel for communication over the WDS link.

Although not shown in FIG. 4, intermediate network devices, such as wireless repeaters and/or other infrastructure devices may be used to extend the serving range of a WLAN. A WLAN repeater typically receives radio signals from an access point, a subscriber station, or another repeater and retransmits (or relays) the radio signals to another WLAN device. A wireless repeater may be, e.g., a single-radio wireless repeater or a multi-radio wireless bridge (e.g., a dual-radio bridge that can receive a data frame via one radio and can forward the data frame via the second radio). Further, a wireless repeater/bridge may be a dedicated device or may be provided as a built-in function of another device (e.g., an access point may be configured as a wireless repeater).

Access point and subscriber nodes within WLAN 40 may communicate over respective wireless links using any suitable communication protocol(s) defined for the 802.11 air interface, such as (i) 802.11a that operates between the 5-6 GHz frequency range and supports data bandwidth of up to 54

Mbps, (ii) 802.11b that operates within the 2.4 GHz frequency range and supports data bandwidth of up to 11 Mbps, and/or (iii) the 802.11g that operates within the 2.4 GHz frequency range, supports data bandwidth of up to 54 Mbps, and is backward compatible with the 802.11b.

Note, however, that the maximum data throughput that can be achieved at a given WLAN access point will typically depend on a variety of factors, such as (among others) RF interference and/or the physical distance of served station(s) from the access point, and may be significantly lower from the theoretical data throughput set forth by the 802.11 standards. For example, the maximum data throughput of a WLAN access point may be in actuality closer to 6 Mbps rather than the theoretical 11 Mbps. Further, an amount of data bandwidth provided by the access point to data traffic associated with individual subscriber stations will be limited by a number of subscriber stations being served at the given access point.

In particular, IEEE 802.11 WLANs are considered shared-medium networks because communicating stations (i.e., subscriber stations and base stations (e.g., access points)) must share access to the communication medium, which in the case of a WLAN is the RF channel. Specifically, the basic channel-access method in 802.11-based WLANs is based on a carrier sense multiple access with collision avoidance (CSMA/CA). According to the CSMA/CA, a WLAN station that wishes to transmit data onto the channel must first sense the channel to determine whether the channel is "busy" with the transmission of a data frame from another station. The station can accomplish this by monitoring the energy level on the RF channel. If the channel is idle for at least a specified amount of time (known as the Distributed Inter Frame Space (DIFS)), the station may transmit. Otherwise, the station performs a backoff procedure in which the station will defer its access onto the channel until the channel is later sensed to be idle.

Since the stations in a WLAN share access to the RF communication channel, the stations also share available data bandwidth of the channel. In particular, a quantity of data bandwidth (e.g., 11 Mbps or 54 Mbps) at an 802.11 base station operating on a given channel will normally be shared among all the subscriber stations served by the base station. As such, the quantity of data bandwidth at the 802.11 base station will decrease as the number of subscriber stations served by the base station increases.

For example, a given access point will be typically equipped with one or more 802.11 radios that are each tuned to operate on a single channel at a time (e.g., one of the eleven (1-11) 802.11b/g channels). If the access point directly serves a number of concurrent subscriber stations on a particular channel, each of its directly served subscriber stations operating on that channel will only get a portion of limited data bandwidth associated with the channel. Further, the access point may additionally need to handle data traffic associated with subscriber stations served by other access point(s) that are served directly by the given access point. Thus, the amount of data bandwidth available at the given access point for distribution to its directly served subscriber stations will effectively decrease, and the data bandwidth will need to be shared among all of the subscriber stations being served (directly and indirectly through other access point(s)) by the given access point.

For example, as shown in FIG. 4, each of access points 44, 46, and 48 within WLAN 40 forwards subscriber data traffic between associated subscriber stations and access point 42 connected to wired network 58. In effect, within the tree structure of WLAN 40, access point 42 (i.e., base station node 42), will handle data traffic to/from each of its directly served subscriber stations 42a-b (i.e., child subscriber nodes 42a-b) and also data traffic to/from each of subscriber stations 44a, 46a-c, and 48a-d (i.e., descendant subscriber nodes of base station node 42) communicated between access point 42 and each of access points 44 and 46 being directly served by access point 42.

Further, if access point 42 has a limited quantity of data bandwidth dedicated to subscriber data communications, the data bandwidth may need to be shared among all of subscriber stations 42a-b, 44a, 46a-c, and 48a-d being currently served by access point 42. In one particular example illustrated in FIG. 4, access point 42 may be tuned for communications on a given 802.11b/g channel (e.g., Channel 1, as shown in FIG. 4) and will thus need to share the available 802.11-channel data bandwidth among all of its descendant subscriber stations, i.e., subscriber stations 42a-b, 44a, 46a-c, and 48 a-d.

Note that, in one alternative example, rather than serving all of its descendant subscriber stations, i.e., subscriber stations 42a-b, 44a, 46a-c, and 48 a-d, on the same channel, access point 42 may be configured to serve subscriber stations 42a-b on a different channel (e.g., Channel 6) than subscriber stations 44a, 46a-c, and 48 a-d. For instance, access point 42 may be equipped with multiple radios, with one radio (e.g., an 802.11b/g radio) dedicated to data traffic associated with subscriber stations directly served by access point 42 and another radio (e.g., an 802.11a radio) dedicated to subscriber data traffic communicated between access point 42 and other access point(s) that are served directly by access point 42. In such scenario, it may be then desirable to allocate at access point 42 a quantity of data bandwidth associated with the radio dedicated to subscriber data traffic communicated between access point 42 and each of access points 44 and 46 being directly served by access point 42. Other alternatives may also be possible.

According to one embodiment of the invention, in order to allocate a quantity of data bandwidth at access point 42, access point 42 may be configured (e.g., programmed with appropriate program logic stored in a data storage element and executed by a processor (e.g., a general-purpose or dedicated processor)) to carry out the representative bandwidth allocation process illustrated in FIG. 3.

Specifically, access point 42 may be configured (i) to determine a total number of descendant subscriber stations of the access point and (ii) to use the total number of descendant subscriber stations of the access point as a basis to proportionally allocate the quantity of data bandwidth at the access point for distribution of the data bandwidth among the total number of descendant subscriber stations.

In a preferred embodiment, the determination of the total number of descendant subscriber stations of access point 42 may involve calculating a sum of a count of child subscriber stations (if any) being directly served by access point 42 (e.g., child subscriber stations 42a-b) and a total count of descendant subscriber stations of one or more child access points being served directly by access point 42.

In one example, if access point 42 directly serves a plurality of access points (e.g., child access points 44 and 46 as shown in FIG. 4), then the total count of descendant subscriber stations of the plurality of access points being served directly by access point 42 may be determined based on a sum of respective counts of descendant subscriber stations of the plurality of child access points.

For instance, in FIG. 4, the total count of descendant subscriber stations of access points 44 and 46 may be the sum of the respective count of descendant subscriber stations of access point 44 and the respective count of descendant subscriber stations of access point 46. (Alternatively, if access point 42 were to directly serve a single access point, then the total count of descendant subscriber stations may be determined based on a count of descendant subscriber stations of the single access point).

As shown in FIG. 4, the count of descendant subscriber stations of access point 44 is five (5) subscriber stations (i.e., the sum of subscriber station 44a and subscriber stations 48a-d) and the count of descendant subscriber stations of access point 46 is three (3) subscriber stations (i.e., subscriber stations 46a-c). Thus, the total count of descendant subscriber stations of access points 44 and 46 may then be calculated as eight (8) descendant subscriber stations (i.e., the sum of the five descendant subscriber stations of access point 44 and the three descendant subscriber stations of access point 46). Further, the total number of descendant subscriber stations of access point 42 may be then determined as the sum of (i) the eight descendent subscriber stations of child access points 44 and 46 served directly by access point 42 and (ii) the two child subscriber stations (i.e., subscriber stations 42a-b) served directly by access point 42, resulting in the total number of 10 descendent subscriber stations of access point 42.

As such, if the quantity of data bandwidth available at access point 42 is 11 Mbps (e.g., the maximum 802.11b bandwidth) and the access point has determined the total number of its descendant subscriber stations to be 10 descendant subscriber stations, then the access point may proportionally allocate 11 Mbps of bandwidth among the ten descendant subscriber stations.

In one particular example, the access point may divide 11 Mbps of bandwidth by the total number of descendant subscriber stations to establish a per-subscriber bandwidth ration. Access point 42 may then allocate the per-subscriber bandwidth ration to each (child) subscriber stations (if any) being served directly by the access point, and may further allocate to each (child) access point being served directly by the access point a mathematical product of the per-subscriber bandwidth ration and the respective count of descendant subscriber stations of the (child) access point.

For example, access point 42 may calculate the per-subscriber bandwidth ration by dividing the 11 Mbps bandwidth by 10. Thus, the per-subscriber bandwidth ration will be 1.1 Mbps. The access point may then allocate the per-subscriber bandwidth ration of 1.1 Mbps to each of subscriber stations 42a and 42b.

Further, the access point may allocate the bandwidth of 5.5 Mbps to access point 44 by multiplying the per-subscriber bandwidth ration of 1.1 Mbps by the count of descendant subscriber stations of access point 44, i.e., five (5). In a similar way, the access point may allocate the bandwidth of 3.3 Mbps to access point 46 by multiplying the per-subscriber bandwidth ration of 1.1 Mbps by the count of descendant subscriber stations of access point 46, i.e., three (3).

Further, in one embodiment, each of descendant subscriber nodes of a given base station node, such as access point 42, carrying out the representative bandwidth allocation process illustrated in FIG. 2, may have a specific level of service associated with the descendant subscriber node. For example, each of the descendant subscriber nodes may be guaranteed a certain level of data rate (or bandwidth) at any given moment.

As such, the given base station node may be additionally configured to use the respective service level of each of the descendant subscriber nodes as a further basis to proportionally allocate the quantity of data bandwidth at the given base station node. In this regard, the given base station node may maintain for reference a record of the respective service level of each of the descendant subscriber nodes of the given base station node in a data store located internally or externally to the given base station node. For instance, in FIG. 4, such record may be stored internally at access point 42 or, alternatively, in a database located on wired network 58.

In one example, the given base station node may allocate a relatively greater amount of data bandwidth to a descendant subscriber node with a higher level of service than a descendant subscriber node with a lower level of service. For example, the descendant subscriber node with the higher service level may be guaranteed a higher data rate than the descendant subscriber node with the lower service level. In another example, a service level of a descendant subscriber node of the given base station node may provide an indication of a minimum amount of data bandwidth that is to be allocated to the descendant subscriber node. In such case, the given base node may allocate to the descendant subscriber node at least the minimum amount of data bandwidth. Other examples may also be possible.

In one preferred embodiment, in order to facilitate determination of the total number of descendant subscriber stations of access point 42, access point 42 may receive from each child access point being served directly by access point 42 (i.e., access point 44 and access point 46), a notification indicating a count of descendant subscriber stations of the child access point. To determine the total number of descendant subscriber stations of access point 42, access point 42 may then determine a sum of (i) the count of child subscriber stations 42a-b of access point 42 and (ii) a total count of descendant subscriber stations of child access points 44 and 46. The access point may then proportionally allocate the quantity of bandwidth among the total number of descent subscriber stations of access point 42.

In some embodiments, access point 42 may additionally receive from each of the child access points being served directly by access point 42 an indication of a respective service level of each of the descendant subscriber stations of access point 42. Access point 42 may then use this information as a further basis to proportionally allocate the quantity of bandwidth among the total number of descent subscriber stations of access point 42.

Figure 5:
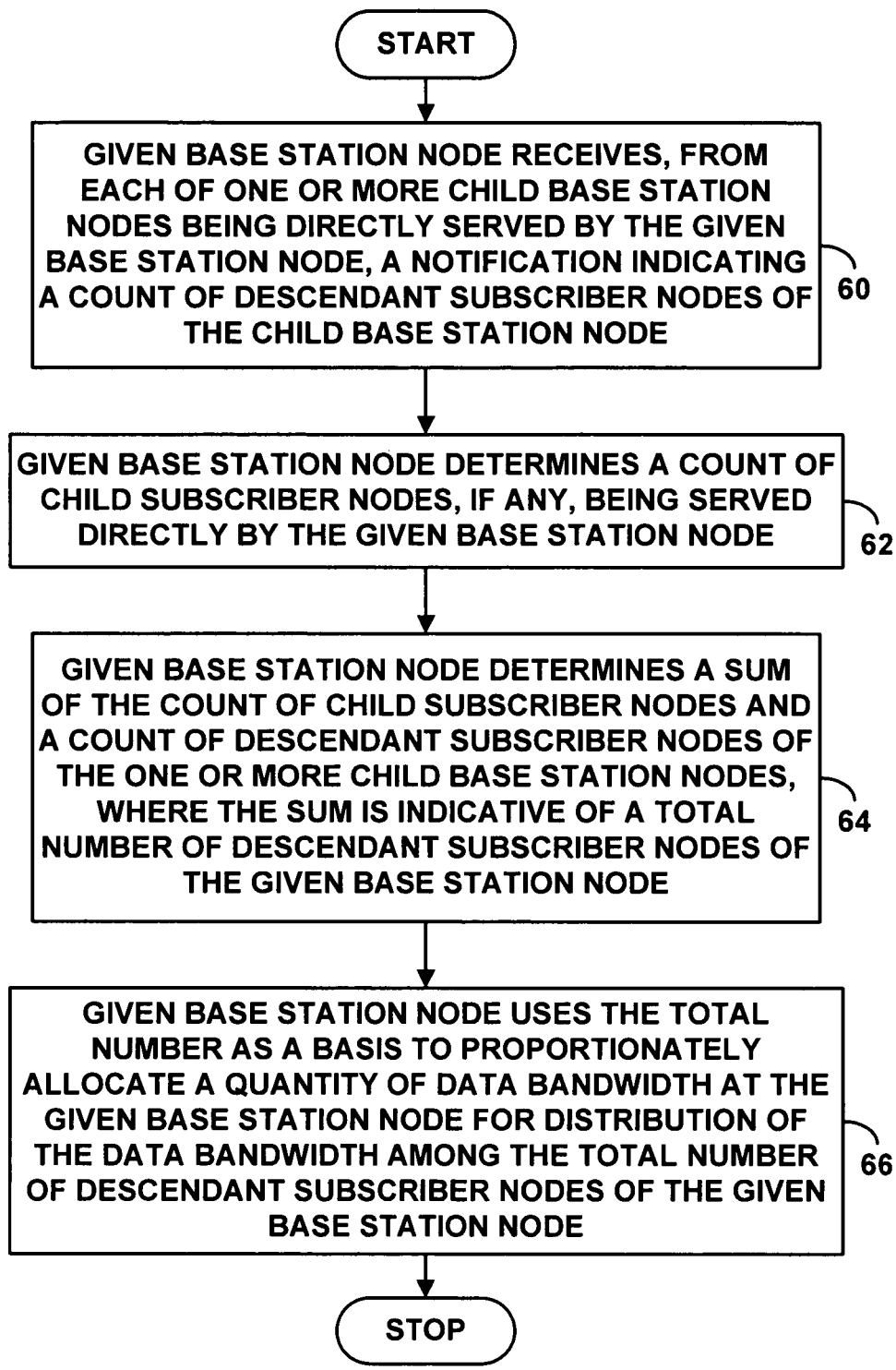
FIG. 5 is a flow chart depicting functions that may be carried out according to one particular embodiment.

FIG. 5 is a flow chart summarizing a set of functions that could be carried out to allocate data bandwidth for distribution to descendant subscriber nodes of a given base station node within a tree structure, where the given base station node directly serves a plurality of child nodes including at least one child base station node that itself directly serves at least one child subscriber node, in accordance with the preferred embodiment.

As shown in FIG. 5, at step 60, the given base station node receives, from each of one or more child base station nodes being directly served by the given base station node, a notification indicating a count of descendant subscriber nodes of the child base station node. At step 62, the given base station node determines a count of child subscriber nodes, if any, being served directly by the given base station node. At step 64, the given base station node determines a sum of the count of child subscriber nodes and a count of descendant subscriber nodes of the one or more child base station nodes, where the sum is indicative of a total number of descendant subscriber nodes of the given base station node. Finally, at step 66, the given base station node uses the total number as a basis to proportionally allocate a quantity of data bandwidth at the given base station node for distribution of the data bandwidth among the total number of descendant subscriber nodes of the given base station node.

According to one example embodiment, WLAN 40 may be configured such that each child access-point node (or child base station node) being directly served by a higher-level parent access-point node (or parent base station node) will notify its parent access-point node of a number of descendant subscriber-station nodes (or subscriber nodes) of the child access-point node. (Note that some parent base station nodes within a given tree structure will act as child base station nodes to other parent base station nodes).

These notifications may be propagated upstream within the tree structure from lower-level access-point nodes to higher-level access-point nodes until this information is completely distributed throughout the tree structure up to the highest-level (root) access-point node. (Note that information regarding service levels of respective descendant subscriber-station nodes may be additionally or in similar way distributed among the access-point nodes within the tree.)

In general, information regarding current subscriber associations at individual access-point nodes within a tree may facilitate a determination of a count of descendant subscriber-station nodes of each given child access-point node in the tree.

In a typical WLAN, subscriber stations operating within a coverage area of a given access point must first "associate" with the given access point in order to be able to transmit and receive data within the coverage area of the access point. The association of a subscriber station with an access point refers to a logical connection between the subscriber station and the access point, and each access point in a WLAN will typically maintain a stored record of its current subscriber associations. Thus, each access point will be aware of how many subscriber stations the access point is currently serving directly. According to the 802.11 standards, each subscriber station can associate with only one access point at a time.

Thus, in the tree arrangement of FIG. 4, child access point 48 (which does not serve as a parent node to any other node) may notify its parent access point 44 at the next level that is currently associated with four (4) subscriber stations. When access point 44 receives this information from access point 48, access point 48 may determine a count of its descendant subscriber stations as a sum of (i) four (4) subscriber stations currently associated with child access point 48 and (ii) a number of subscriber stations currently associated with access point 44, i.e., one (1) subscriber station. Access point 44 may, in turn, notify its parent access point 42 at the next level of the count of descendant subscriber stations (i.e., five (5)) of access point 44.

Similarly, child access point 46 (which does not serve as a parent node to any other node) may notify its parent access point 42 at the next level that is currently associated with three (3) subscriber stations. When access point 42 receives this information from access point 46, access point 42 may determine a total number of its descendant subscriber stations as a sum of (i) five (5) descendant subscriber stations of its child access point 44, (ii) three (3) subscriber stations currently associated with child access point 46 and (iii) a number of subscriber stations currently associated with access point 42, i.e., two (2) subscriber stations. Thus, access point 42 may determine the total number of its descendant subscriber stations to be ten (10) descendant subscriber stations.

Note that in the above example, each respective access point may be programmed with appropriate set of program instructions that may be executed by a processor to carry out the functions described herein.

Generally, notifications regarding counts of descendant subscriber nodes of respective child base station nodes within a wireless network (arranged as a tree) may be sent out to each respective parent node on a periodic basis and/or may be triggered whenever a change occurs in the number of descendant subscriber nodes of a given child base station node in the network. These changes may include such scenarios as a subscriber node moving out of the coverage area of the wireless network, the subscriber node being "handed off" from one base station node to another base station node as the subscriber node roams through the network, the subscriber node powering down, and various other possible scenarios.

Further, in some embodiments, whenever a given base station node, such as access point 42, carrying out the representative bandwidth allocation process illustrated in FIG. 3, detects a change in a total number of descendant subscriber nodes of the given base station node, the given base station node may be configured to responsively reallocate a quantity of data bandwidth at the given base station node for distribution of the data bandwidth among the total number of descendant subscriber nodes of the given base station node. The given base station node may learn of the change in the total number of descendant subscriber nodes by means of notifications received from its respective child base station node(s), by detecting a change in a number of subscriber nodes served directly by the given base station node, and/or by some other means.

As one example, in FIG. 4, access point 42 may receive from (child) access point 44 a notification indicating a change in a count of descendant subscriber stations of access point 44. For example, the notification may indicate that the count has dropped from five (5) descendant subscriber nodes to three (3). In response, access point 42 may reallocate a quantity of data bandwidth at access point 42 based on a newly calculated total number of descendant subscriber stations of access point 42. Specifically, access point 42 may reallocate the quantity of data bandwidth based the new total of eight (8) descendant subscriber stations.

3. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. In a wireless communication system arranged as a tree structure having a plurality of nodes, wherein each of the plurality of nodes is either a subscriber node or a base station node, wherein each base station node is arranged to serve one or more child nodes directly over a respective air interface, and wherein a first base station node directly serves a plurality of child nodes each over a respective air interface, the plurality of child nodes including at least one child base station node that itself directly serves at least one child subscriber node, a method comprising:

determining a total number of descendant subscriber nodes of the first base station node; and using the total number as a basis to proportionally allocate a quantity of data bandwidth at the first base station node for distribution of the data bandwidth among the total number of descendant subscriber nodes of the first base station node, wherein using the total number as a basis to proportionally allocate the quantity of data bandwidth at the first base station node comprises (i) dividing the quantity of data bandwidth by the total number of descendant subscriber nodes to establish a per-subscriber bandwidth ration, (ii) allocating to each child subscriber node, if any, of the first base station node the per-subscriber bandwidth ration, and (iii) allocating to each child base station node of the first base station node a mathematical product of the per-subscriber bandwidth ration and a count of descendant subscriber nodes of the child base station node.

2. The method of claim 1, wherein determining a total number of descendant subscriber nodes of the first base station node comprises determining a sum of:
   a count of child subscriber nodes, if any, served directly by the first base station node; and
   a count of descendant subscriber nodes of the at least one child base station node of the first base station node.

3. The method of claim 2, wherein each of the descendant subscriber nodes of the first base station node has a respective service level, the method further comprising:
   using the respective service level of each of the descendant subscriber nodes of the first base station node as a further basis to proportionally allocate the quantity of data bandwidth at the first base station node.

4. The method of claim 3, further comprising maintaining a record of the respective service level of each of the descendant subscriber nodes of the first base station node in a data store located internally or externally to the first base station node.

5. The method of claim 3, wherein the descendant subscriber nodes of the first base station node include a first descendant subscriber node having a first service level and a second descendant subscriber node having a second service level, wherein the second service level is higher than the first service level, and wherein using the respective service level of each of the descendant subscriber nodes of the first base station as a further basis to proportionally allocate the quantity of data bandwidth at the first base station node comprises:
   based on the first and second service levels, allocating a relatively greater amount of data bandwidth to the second descendant subscriber node than to the first descendant subscriber node.

6. The method of claim 3, wherein the respective service level of at least a given one of the descendant subscriber nodes of the first base station node provides an indication of a minimum amount of data bandwidth for allocation to the given descendant subscriber node, and wherein using the respective service level of each of the descendant subscriber nodes of the first base station node as a further basis to proportionally allocate the quantity of data bandwidth at the first base station node comprises:
   allocating to the given descendant subscriber node at least the minimum amount of data bandwidth.

7. The method of claim 1, further comprising:
   detecting a change in the total number of descendant subscriber nodes of the first base station node; and
   responsively reallocating the quantity of data bandwidth at the first base station node.

8. The method of claim 1, wherein one or more child subscriber nodes, if any, served directly by the first base station node wirelessly communicates with the first base station node via at least one wireless repeater.

9. The method of claim 1, wherein one or more of the at least one child base station node served directly by the first base station node wirelessly communicates with the first base station node via at least one wireless repeater, and wherein the at least one wireless repeater includes a single-radio wireless repeater or a multi-radio bridge.

10. The method of claim 1, wherein the at least one child base station node served directly by the first base station node comprises a cellular base station or a Wireless Local Area Network (WLAN) access point.

11. The method of claim 1, wherein the first base station node is an 802.11 base station, and wherein each of the at least one child base station nodes is also an 802.11 base station.

12. The method of claim 1, wherein the first base station node has a connectivity to a wired network, and wherein each of the at least one child base station nodes served directly by the first base station node is a Wireless Local Area Network (WLAN) access point.

13. In a wireless communication system arranged as a tree structure having a plurality of nodes, wherein each of the plurality of nodes is either a subscriber node or a base station node, wherein each base station node is arranged to serve one or more child nodes directly over a respective air interface, and wherein a first base station node directly serves a plurality of child nodes each over a respective air interface, the plurality of child nodes including at least one child base station node that itself directly serves at least one child subscriber node, a method comprising:
   receiving, from each of the at least one child base station node being served directly by the first base station node, a notification indicating a count of descendant subscriber nodes of the child base station node;
   determining a count of child subscriber nodes, if any, being served directly by the first base station node;
   determining a sum of the count of child subscriber nodes and a count of descendant subscriber nodes of the at least one child base station node served directly by the first base station node, the sum being indicative of a total number of descendant subscriber nodes of the first base station node; and
   using the total number as a basis to proportionally allocate a quantity of data bandwidth at the first base station node for distribution of the data bandwidth among the total number of descendant subscriber nodes of the first base station,
   wherein using the total number as a basis to proportionally allocate the quantity of data bandwidth at the first base station node comprises (i) dividing the quantity of data bandwidth by the total number of descendant subscriber nodes to establish a per-subscriber bandwidth ration, (ii) allocating to each child subscriber node, if any, of the first base station node the per-subscriber bandwidth ration, and (iii) allocating to each child base station node of the first base station node a mathematical product of the per-subscriber bandwidth ration and the number of descendant subscriber nodes of the child base station node.

14. The method of claim 13, wherein the at least one child base station node served directly by the first base station node is a plurality of child base station nodes, and wherein determining the sum of the count of child subscriber nodes and the count of descendant subscriber nodes of the at least one child base station node served directly by the first base station node comprises:
   determining the count of descendant subscriber nodes of the at least one child base station node served directly by the first base station node based on a sum of respective counts of descendant subscriber nodes of the plurality of child base station nodes.

15. The method of claim 13, wherein the at least one child base station node served directly by the first base station node is one child base station node, and wherein determining the sum of the count of child subscriber nodes and the count of descendant subscriber nodes of the at least one child base station node served directly by the first base station node comprises:

determining the count of descendant subscriber nodes of the at least one child base station node served directly by the first base station node based on a count of descendant subscriber nodes of the one child base station node.

16. The method of claim 13, wherein each of the descendant subscriber nodes of the first base station node has a respective service level, the method further comprising:

using the respective service level of each of the descendant subscriber nodes of the first base station node as a further basis to proportionally allocate the quantity of data bandwidth at the first base station node.

17. The method of claim 16, further including:

receiving, from each child base station node being served directly by the first base station node, an indication of a respective service level of each of the descendant subscriber nodes of the child base station node.

18. In a wireless communication system arranged as a tree structure having a plurality of nodes, wherein each of the plurality of nodes is either a subscriber node or a base station node, wherein each base station node is arranged to serve one or more child nodes directly over a respective air interface, and wherein a first base station node directly serves a plurality of child nodes each over a respective air interface, the plurality of child nodes including at least one child base station node that itself directly serves at least one child subscriber node, the improvement comprising:

a processor;

data storage; and program logic stored in the data storage and executable by the processor (i) to determine a total number of descendant subscriber nodes of the first base station node and (ii) to use the total number as a basis to proportionally allocate a quantity of data bandwidth at the first base station node for distribution of the data bandwidth among the total number of descendant subscriber nodes of the first base station node, wherein using the total number as a basis to proportionally allocate the quantity of data bandwidth at the first base station node comprises (a) dividing the quantity of data bandwidth by the total number of descendant subscriber nodes to establish a per-subscriber bandwidth ration, (b) allocating to each child subscriber node, if any, of the first base station node the per-subscriber bandwidth ration, and (c) allocating to each child base station node of the first base station node a mathematical product of the per-subscriber bandwidth ration and the number of descendant subscriber nodes of the child base station node.

* * * * *